US007937489B2

(12) United States Patent
Shizuno

(10) Patent No.: US 7,937,489 B2
(45) Date of Patent: May 3, 2011

(54) SYSTEM AND METHOD FOR DETECTING PORT HOPPING

(75) Inventor: Takayuki Shizuno, Tokyo (JP)

(73) Assignee: NEC Corporation, Tokyo (JP)

( * ) Notice: Subject to any disclaimer, the term of this patent is extended or adjusted under 35 U.S.C. 154(b) by 1109 days.

(21) Appl. No.: 11/528,362

(22) Filed: Sep. 28, 2006

(65) Prior Publication Data

US 2007/0073838 A1 Mar. 29, 2007

(30) Foreign Application Priority Data

Sep. 29, 2005 (JP) .................................. 2005-283320

(51) Int. Cl.
*G06F 15/16* (2006.01)
(52) U.S. Cl. ....................................................... 709/232
(58) Field of Classification Search .................. 709/224, 709/217, 232
See application file for complete search history.

(56) References Cited

U.S. PATENT DOCUMENTS

| 6,356,951 | B1* | 3/2002 | Gentry, Jr. ..................... | 709/250 |
|---|---|---|---|---|
| 2003/0126233 | A1* | 7/2003 | Bryers et al. .................. | 709/219 |
| 2007/0011317 | A1* | 1/2007 | Brandyburg et al. ......... | 709/224 |
| 2007/0070996 | A1* | 3/2007 | Oran .............................. | 370/389 |

FOREIGN PATENT DOCUMENTS

| JP | 2003-8636 A | 1/2003 |
|---|---|---|
| JP | 2004-38557 A | 2/2004 |
| JP | 2004-140618 A | 5/2004 |
| JP | 2004-236258 A | 8/2004 |
| JP | 2004-536522 A | 12/2004 |

OTHER PUBLICATIONS

The Institute of Electronics, Information and Communication Engineers, 2005 General conference B-6-43, a third conventional example.
Tatsuya Mori, et. al. :"Internet traffic flow analysis: characteristics comparison between web and p2p" The Institute of Electronics, Information and Communication Engineers, May 1, 2004, vol. J87-D-1, No. 5, pp. 561-571.
Seiichiro Inoue: "Basic knowledge of P2P technology" [2] Unix Magazine, Ascii Corporation. Oct. 1, 2005, vol. 20 pp. 91-117.
Satoshi Togawa, et. al. :"Peer-to-Peer File Sharing Detection Assistance System Using the Traffic Activity Extraction and Visualization", information Processing Society research report, Mar. 18, 2005, vol. 2005, No. 31, pp. 85-90, Information Processing Society of Japan.
Katsuo Yamada, Latest P2P, its mechanism and defense measures against it, Nov. 1, 2004, vol. 4, No. 11, p. 84-93, Softbank publishing Corporation, N+I Network.

* cited by examiner

*Primary Examiner* — Quang N. Nguyen
*Assistant Examiner* — Andrew Woo
(74) *Attorney, Agent, or Firm* — Sughrue Mion, PLLC

(57) ABSTRACT

A port hopping flow detection system includes a storage section configured to store flow data for each of past flows of packets which have been transmitted from application programs and an application data for each of the application program. A receiving unit receives a new flow of packets. A detecting unit extracts a flow data for the new flow to store in the storage section, calculates an application data for the new flow from the extracted flow data for the new flow to compare the calculated application data with the application data stored in the storage section, and determines whether the new flow has been subjected to port hopping.

20 Claims, 5 Drawing Sheets

SYSTEM AND METHOD FOR DETECTING PORT HOPPING

BACKGROUND OF THE INVENTION

1. Field of the Invention

The present invention relates to a system and method for detecting a flow of packets which pass through a network while using port hopping.

2. Description of the Related Art

On the Internet, there is an application (program) which uses as many bands as possible by utilizing the P2P (Peer to Peer) technique, to transfer a large amount of data as a flow of packets by using a false port number. When such an application is used, most of available bands in an ISP (Internet Service Provider) is used by a part of users. Therefore, when there is the flow for transfer of a large amount of data for a long time, the ISP restricts such a flow in accordance with a network management policy. At this time, the application needs to be identified to judge whether the flow is valid or valid.

As an application identification technique of a first conventional example, an "Unauthorized Access blockade System" is disclosed in Japanese Laid Open Patent Application (JP-P2004-38557A). In the first conventional example, a combination of a source IP address and a destination IP address for a valid flow and contents of a packet in the flow are stored as a pattern of the valid flow. An application is identified based on whether the pattern of the received flow is coincident with the pattern of the valid flow.

Also, Japanese Laid Open Patent Application (JP-P2004-140618A), a second conventional example) discloses a "Packet Filter Device and Unauthorized Access Detecting Apparatus". In the second conventional example, a bit pattern of a packet of an invalid flow is previously stored and an application is identified based on whether or not the bit pattern of a received packet is coincident with the stored bit pattern.

Also, "Invalid Traffic Detecting Method Through Traffic Behavior Monitoring" is disclosed in a paper, (The Institute of Electronics, Information and Communication Engineers, 2005 General conference B-6-43, a third conventional example). In this conventional example, flow features defined based on statistical features such as a packet length average value, a packet length variance value, a packet arrival interval average value and a packet arrival interval variance value are previously stored, and an application is identified based on whether or not the features of a received flow is coincident with the stored statistical flow features.

Here, in the above conventional examples, a first problem is in that it is not possible to detect an application often using "port hopping", in which a port is changed in a short time to prevent band restriction by the ISP. This is because the port hopping is not taken into account in the first to third conventional examples and a plurality of flows generated by one application is individually identified for each port.

A second problem is in that change of a port used by a flow, which is generated by the application, cannot be continuously followed. This is because the first to third conventional examples individually identify a plurality of flows generated by the application and do not take into account of a relation between the identified flows.

A third problem is in that the identification accuracy of the application is low. This is as follows. In the first to third conventional examples, as an observation time becomes longer, the application identification accuracy becomes higher. However, in identifying the application often using the port hopping, the flow observation time is shorter and thus reliability is decreased. Especially, in the third conventional example, when the observation time is short, the accuracy of the flow features defined by the statistical flow features is greatly lowered.

In conjunction with the above description, a dynamic traffic bandwidth control system for a communication network is disclosed in Japanese Laid Open Patent Application (JP-P2004-536522A). The conventional communication system includes a network system apparatus connected with the Internet via a switching telephone network, a plurality of subscriber home terminals, and a network terminator, and configured to set a connection among the above equipments and network and provide sound service and data service to a plurality of customer premises, and a network control system connected with the network system apparatus, and configured to adjust a connection between the plurality of subscriber home terminals and the telephone network to control a traffic. The network control system includes a first database which contains a system configuration data and a configuration data for each of the subscriber home terminals connected with the network system apparatus; a second database which contains a data indicative of a service connection currently being used in the communications system and use by each of the subscriber home terminals, and a control processor configured to periodically poll the first and second databases to specify a capacity of the band which is used currently in the communication system, and throttle a quantity of the data service supplied to the communications system according to the use of this specified bandwidth.

Also, a private line service system is disclosed in Japanese Laid Open Patent Application (JP-P2004-236258A). A conventional private line service providing system specifies a destination node by an information terminal of a subscriber, sets a private line between a source node of the subscriber and the destination node, and dynamically change the destination node.

Also, a network control framework apparatus is disclosed in Japanese Laid Open Patent Application (JP-P2003-8636A). A communication network includes a gateway module which gives a gateway function among end users; a service quality (QoS) module which gives QoS data of a communication network; a rule engine module which carries out a network resource control based on a specified rule, the rule being specified in a rule specification format; and a rule insertion module which inserts a rule specification in the rule engine and removes a rule specification from the rule engine. The network control framework apparatus controls the resources in an intermediate network element between the two or more of the above communication networks.

SUMMARY OF THE INVENTION

An object of the present invention is to provide a system which can detect an application often using port hopping.

Another object of the present invention is to provide a system which can continuously follow change of a port used by an application.

Still Another object of the present invention is to provide a system which can improve the identification accuracy of an application.

In an aspect of the present invention, a port hopping flow detection system includes a storage section configured to store flow data for each of past flows of packets which have been transmitted from application programs and an application data for each of the application program. A receiving unit receives a new flow of packets. A detecting unit extracts a flow data for the new flow to store in the storage section, calculates an application data for the new flow from the extracted flow data for the new flow to compare the calculated application data with the application data stored in the storage section, and determines whether the new flow has been subjected to port hopping.

Here, the flow data includes a source IP (Internet Protocol) address, a destination IP address, a source port number, a destination port number and a protocol number which are contained in a header of the received packet. Also, the application data includes a port change time difference, a flow continuation time, a port number relation and a flow feature.

The detecting unit includes a port change time difference calculating section, a flow continuation time calculating section, a port number relation calculating section and a flow feature calculating section. A flow separating section extracts the flow data for the new flow to store the extracted flow data in the storage section or update the flow data stored in the storage section. Also, the flow separating section lists up the flow data which have same source IP address and destination IP address as those of the received packet of the new flow to supply the listed flow data to the port change time difference calculating section, the flow continuation time calculating section, the port number relation calculating section and the flow feature calculating section. The port change time difference calculating section calculates the port change time difference from a first packet reception time of the new flow and a last packet reception time of an existing flow; the flow continuation time calculating section calculates the flow continuation time from the first packet reception times of the new flow and the existing flow. The port number relation calculating section calculates the port number relation from a source port number and destination portion number for the new flow and those of the existing flow; and the flow feature calculating section calculates the flow feature of the received flow based on the listed flow data. A port hopping detecting section detects whether a port hopping is carried out in the new flow, based on the application data and the flow data for the new flow and the application data and flow data stored in the storage section.

In this case, the flow separating section may delete the flow data from the storage section when the flow data meets a predetermined condition. Also, when data held in the port change time difference calculating section, the flow continuation time calculating section, the port number relation calculating section and the flow feature calculating section meet a predetermined condition, the flow separating section may delete the data held in the port change time difference calculating section, the flow continuation time calculating section, the port number relation calculating section and the flow feature calculating section.

Also, the port hopping flow detection system may further include a display unit configured to display the flow data stored in the storage section.

Also, the port hopping flow detection system may further include a transmitting unit configured to transmit the packets of the new flow which are sent from the flow separating section.

Also, when the storage section further stores band control policies, the port hopping flow detection system may further include a band control unit configured to restrict a band for the packets of the new flow, which are sent from the flow separating section, based on the band control policies; and a transmitting unit configured to transmit the packets of the new flow whose band is restricted.

In another aspect of the present invention, an operation method of a port hopping flow detection system, is achieved by receiving a new flow of packets; by extracting a flow data for the new flow to store in a storage section, which store flow data for each of past flows of packets which have been transmitted from application programs and an application data for each of the application program; by calculating an application data for the new flow from the extracted flow data for the new flow; and by comparing the calculated application data and the flow data for the new flow with the application data and the flow data for the past flows stored in the storage section, to determine whether the new flow has been subjected to port hopping.

Here, the flow data includes a source IP (Internet Protocol) address, a destination IP address, a source port number, a destination port number and a protocol number which are contained in a header of the received packet. Also, the application data includes a port change time difference, a flow continuation time, a port number relation and a flow feature.

The calculating may be achieved by calculating the port change time difference from a first packet reception time of the new flow and a last packet reception time of an existing flow; by calculating the flow continuation time from the first packet reception times of the new flow and the existing flow; by calculating the port number relation from a source port number and destination portion number for the new flow and those of the existing flow; and by calculating the flow feature of the received flow based on the listed flow data.

Also, the operation method may be achieved by further deleting the flow data from the storage section when the flow data meets a predetermined condition.

Also, the operation method may be achieved by further displaying the flow data stored in the storage section.

Also, the operation method may be achieved by further transmitting the packets of the new flow which are sent from the flow separating section.

Also, the operation method may be achieved by further restricting a band for the packets of the new flow, based on band control policies which are stored in the storage section; and transmitting the packets of the new flow whose band is restricted.

In still another aspect of the present invention, a computer-readable software product is realized for an operation method of a port hopping flow detection system. The operation method of a port hopping flow detection system, is achieved by receiving a new flow of packets; by extracting a flow data for the new flow to store in a storage section, which store flow data for each of past flows of packets which have been transmitted from application programs and an application data for each of the application program; by calculating an application data for the new flow from the extracted flow data for the new flow; and by comparing the calculated application data and the flow data for the new flow with the application data and the flow data for the past flows stored in the storage section, to determine whether the new flow has been subjected to port hopping.

DESCRIPTION OF THE PREFERRED EMBODIMENTS

Hereinafter, a port hopping flow detection system according to the present invention will be described in detail with reference to the attached drawings. In the following description, an application program is simply referred to as an application.

Figure 1:
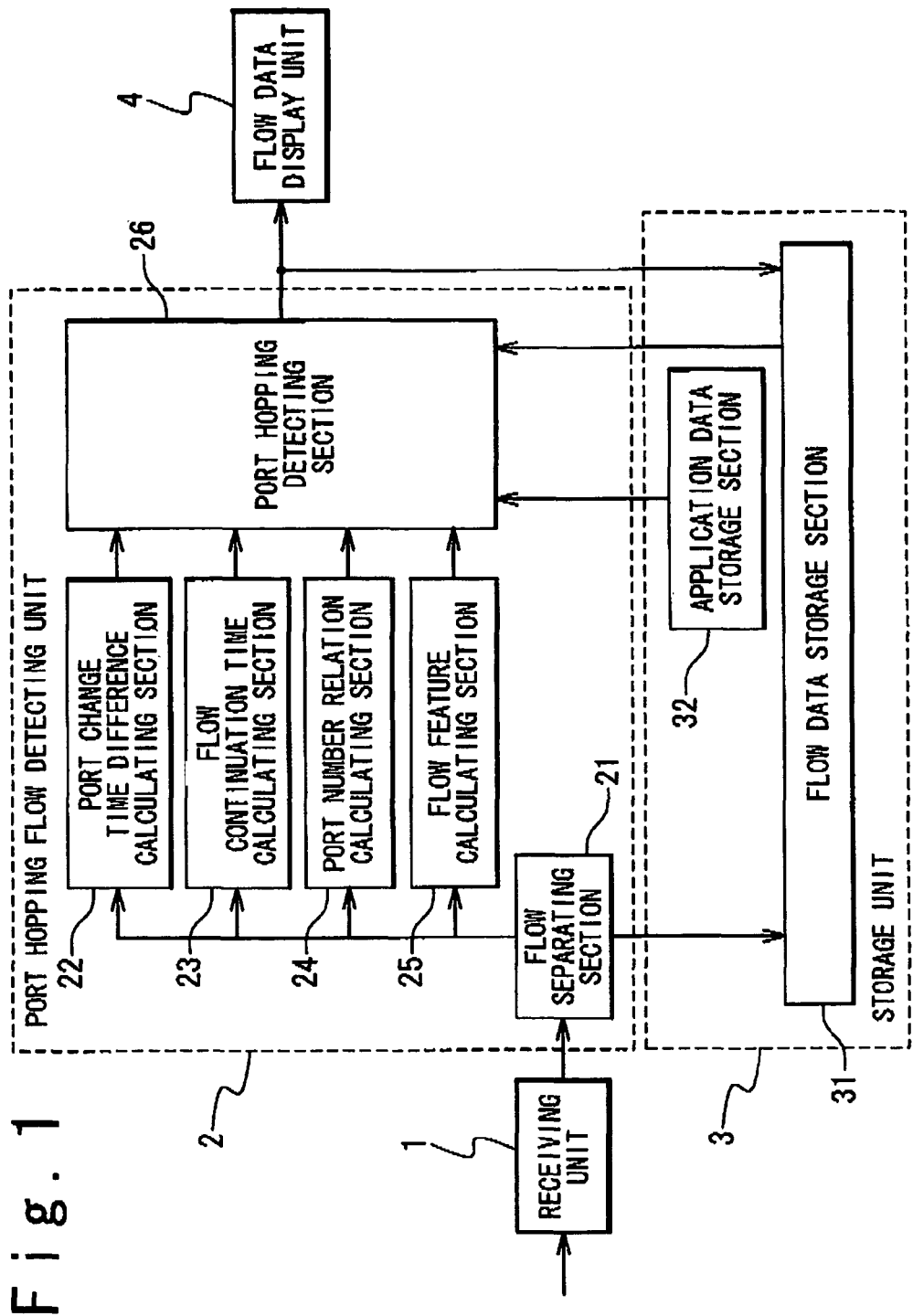
FIG. 1 is a block diagram showing configuration of a port hopping flow detection system according to a first embodiment of the present invention.

FIG. 1 is a block diagram showing the port hopping flow detection system according to the first embodiment of the present invention. Referring to FIG. 1, the port hopping flow detection system in the first embodiment is provided with a receiving unit 1, a port hopping detecting unit 2, a storage unit 3 and a flow data display unit 4. The receiving unit 1 receives flows of packets and sends the flows of packets to the port hopping detecting unit 2. The port hopping detecting unit 2 is provided with a flow separating section 21, a port change time difference calculating section 22, a flow continuation time calculating section 23, a port number relation calculating section 24, a flow feature calculating section 25 and a port hopping detecting section 26. The storage unit 3 has a flow data storage unit 31 and an application data storage unit 32. The flow data storage unit 31 stores a flow data of each flow. The flow data in the flow data storage unit 31 is updated by the flow separating section 21 and the port hopping detecting unit 24. The application data storage unit 32 stores an application data for the application related with each of the flows. The flow data display unit 4 displays the flow data stored in the storage unit 3.

Here, the flow data includes a source IP address, a destination IP address, a source port number, a destination port number and a protocol number which are contained in a header of each of packets of the flow, a first packet reception time, a last packet reception time, and features of the flow. Thus, any flow can be uniquely identified based on the flow data. In a flow of packets which have a same source IP address, a same destination IP address, a same source port number, a same destination port number and a same protocol number, a reception time of the first received packet is defined as the first packet reception time, and a reception time of the last received packet is defined as a last packet reception time. These data is stored in the flow data storage unit 31 as a part of the flow data for the flow.

The flow separating section 21 extracts a combination of the source IP address, destination IP address, source port number, destination port number and protocol number which are contained in the header of a received packet of a flow, and stores them in the flow data storage section 31 in relation with the flow, when the flow is new. When the flow is not new, the flow separating section 21 refers to the flow data stored in the flow data storage section 31 and updates the last packet reception time based on the received packet. If a time difference between a current time and the last packet reception time meets a certain condition when the flow separating section 21 refers to all the flow data stored in the flow data storage section 31, the flow data of the flow is deleted. The certain condition is, for example, that "a certain time difference is present between the current time and the last packet reception time". In addition, when receiving the packets of the new flow and, the flow separating section 21 lists up all the flow data of the flows which have the same combination as that of the source IP address and the destination IP address in the received packet, and sends the listed-up flow data to the port change time difference calculating section 22, the flow continuation time calculating section 23, the port number relation calculating section 24 and the flow feature calculating section 25. When the flow is not new, the section 21 transfers the extracted combination to the port change time difference calculating section 22, the flow continuation time calculating section 23, the port number relation calculating section 24 and the flow feature calculating section 25, after the update of the flow data for the old flow. In addition, when the flow feature calculating section 25 needs the actual packet, the flow separating section 21 sends the actually received packet to the flow feature calculating section 25.

A port change time difference is a time period required for change from a flow A using a port to a flow B using another port, and the flows A and B have the same combination of the same combination of the source IP address and the destination IP address. The port change time difference calculating section 22 calculates the port change time difference from end of reception of packets of an existing flow A to start of reception of packets of a new flow B based on the listed-up flow data. Since the flow data contains the first packet reception time and the last packet reception time for each flow, the port change time difference can be calculated by calculating a difference between the first packet reception time of the new flow B and the last packet reception time of the existing flow A. The port change time difference calculating section 22 sends the calculation result to the port hopping detecting section 26.

The flow continuation time is a time period from the generation of the existing flow A to the generation of the flow B in the port hopping. The flow continuation time calculating section 23 calculates the flow continuation time of the existing flow A from the listed-up flow data of the existing flow A and the new flow B. Since the flow data contains the first packet reception time of each flow, the flow continuation time can be calculated by calculating a time difference between the first packet reception time of the new flow B and the last packet reception time of the existing flow A. The flow continuation time calculating section 23 sends the calculation result to the port hopping detecting section 26.

The port number relation calculating section 24 calculates a port number relation between the new flow B and the existing flow A from the listed-up flow data. The port number relation is a data indicating a relation between port numbers used by two flows. For example, the port number relation indicates a relation between the source port number and destination port number of the flow A and them of the flow B. However, since the port number relation to be calculated depends on features of an application to be detected, the port number relation is not limited to the above-mentioned example. Thus, since the flow data contains the source port number and the destination port number for each flow, the port number relation can be calculated by comparing the source port number and destination port number for the new flow B with the source port number and destination port number for the existing flow A. The port number relation calculating section 24 sends the calculation result to the port hopping detecting section 26.

The flow feature calculating section 25 calculates features of each of the received flows to identify a type of the application. In order to identify the application type, the technique in the first or second conventional example can be used. That is, as described in Japanese Laid Open Patent Application (JP-P2004-38557A), a combination of a source IP address and a destination IP address for a valid flow and contents of a packet in the flow are previously stored as a pattern of the valid flow. An application is identified based on whether the pattern of a received packet is coincident with the pattern of the valid flow. Also, as described in Japanese Laid Open Patent Application (JP-P2004-140618A, a bit pattern of a packet of an invalid flow is previously stored and an application is identified based on whether or not the bit pattern of a received packet is coincident with the bit pattern. The flow feature calculating section 25 sends the identification result of the application type of the flow to the port hopping detecting section 26.

The port hopping detecting section 26 detects the port hopping by comparing an application data such as the port change time difference, the flow continuation time, the port number relation and the flow feature for the received flow and the flow data for the received flow with application data and flow data stored in the application data storage section 32. Since the application carrying out the port hopping has features in the port change time difference, the flow continuation time, the port number relation and the flow feature before and after the port hopping, the port hopping can be detected through comparison of the application data and flow data for the received flow with the application data and flow data stored in the application data storage section 32. The port hopping detecting section 26 relates the flow data of the flows before and after the port hopping, and stores the application data in the application data storage section 32.

The application data storage section 32 stores the application data of the application carrying out the port hopping. The application data is a calculation data from the flow data for the application carrying out the port hopping, such as the port change time difference, the flow continuation time, the port number relation and the flow feature between the flows before and after the port hopping. An example of the application type is a "file-transfer application".

The flow data display unit 4 displays flow data stored in the flow data storage section 31 thereon.

Figure 2:
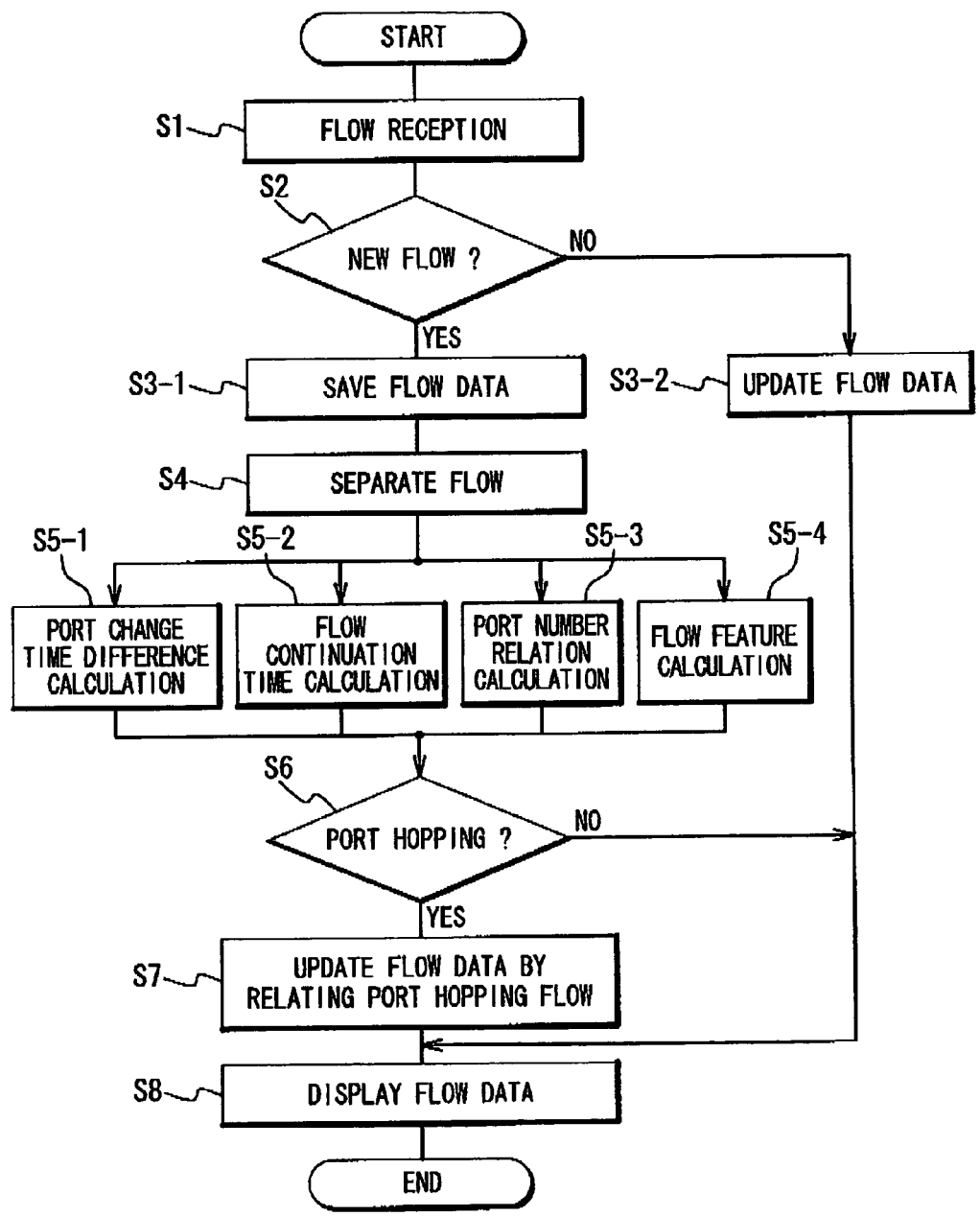
FIG. 2 is a flowchart showing an operation of the port hopping flow detection system according to the first embodiment of the present invention.

Next, referring to FIG. 2, an operation of the port hopping flow detection system according to the first embodiment of the present invention will be described in detail.

(1) Step S1
The port hopping flow detection system of the present invention receives a flow.

(2) Step S2
A combination of a source IP address, a destination IP address, a source port number, a destination port number and a protocol number contained in the header of each of the packets of the flow is extracted. Then, the flow data stored in the flow data storage section 31 is referred to and checked to determine whether or not the flow data having the same combination as the extracted combination is stored in the flow data storage section 31, i.e., whether or not the flow is new. As a result of step S2, when the flow is new, the procedure advances to step S3-1, and when the flow is not new, the procedure advances to step S3-2.

(3) Step S3-1
When it is determined in the step S2 that the flow is not new, the extracted combination is stored in the flow data storage section 31 as the flow data for the received flow.

(4) Step S4
The flow data stored in the flow data storage section 31 are referred up to based on the extracted address combination of the source IP address and the destination IP address, and the flow data having the same address combination as the extracted address combination are partially sent to the port change time difference calculating section 22, the flow continuation time calculating section 23, the port number relation calculating section 24 and the flow feature calculating section 25.

(5) Step S5-1
Then, a port change time difference is a time period required for change from a flow A using a port to a flow B using another port, and the flows A and B have the same combination of the same combination of the source IP address and the destination IP address. The port change time difference calculating section 22 calculates the port change time difference from end of reception of packets of an existing flow A to start of reception of packets of a new flow B based on the listed-up flow data.

(6) Step S5-2
The flow continuation time is a time period from the generation of the existing flow A to the generation of the flow B in the port hopping. The flow continuation time calculating section 23 calculates the flow continuation time of the existing flow A from the listed-up flow data of the existing flow A and the new flow B.

(7) Step S5-3
The port number relation calculating section 24 calculates a port number relation between the new flow B and the existing flow A from the listed-up flow data.

(8) Step S5-4
The flow feature calculating section 25 calculates features of each of the received flows to identify a type of the application.

(9) Step S6
Next, by comparing an application data such as the port change time difference, the flow continuation time, the port number relation and the flow feature for the received flow and the flow data for the received flow with the application data and flow data stored in the application data storage section 32, the port hopping detecting section 26 checks whether the port hopping is present, based on the application data and flow data stored in the application data storage section 32. As a result of step S6, when the port hopping is detected, the procedure advances to a step S7, and when the port hopping is not detected, the procedure advances to a step S8.

(10) Step S7
When the port hopping is detected as a result of the step S6, the port hopping detecting section 26 relates the flow data of the flows before the port hopping and the flow data of the flows after the port hopping and stores the flow data and the relation in the flow data storage section 31. Also, when the port hopping is detected or there is no application data for the received flow, the port hopping detecting section 26 stores as the application data, a combination of the port change time difference, the flow continuation time, the port number relation and the flow feature for the flow in the application data storage section 32.

(11) Step S3-2
When the flow received in the step S2 is not new, the flow separating section 21 refers to the flow data in the storage section 31 and updates the last packet reception time in the flow data for the received flow. Also, when a time difference between a current time and the last packet reception time meets a certain condition, the flow separating section 21 deletes the flow data and the application data satisfying the condition, and deletes the held data in the sections 22 to 25.

(12) Step S8
Finally, the flow data display unit 4 displays the stored flow data.

In this way, in the present embodiment, by calculating the application data such as the port change time difference, the flow continuation time, the port number relation and the flow feature for the received new flow, and by comparing between the application data for the new flow and the application data for each of the existing flows stored in the application data storage section 32, the port hopping can be detected. Further, by relating and storing the application data for the flow having carried out the port hopping, change in a port can be continuously followed. Furthermore, by referring to the detection result to identify an application, even after the port hopping, the flow can be treated as one flow. Therefore, since the flow feature calculating section 25 can observe the flows for a long time, identification accuracy of the application type can be improved.

Figure 3:
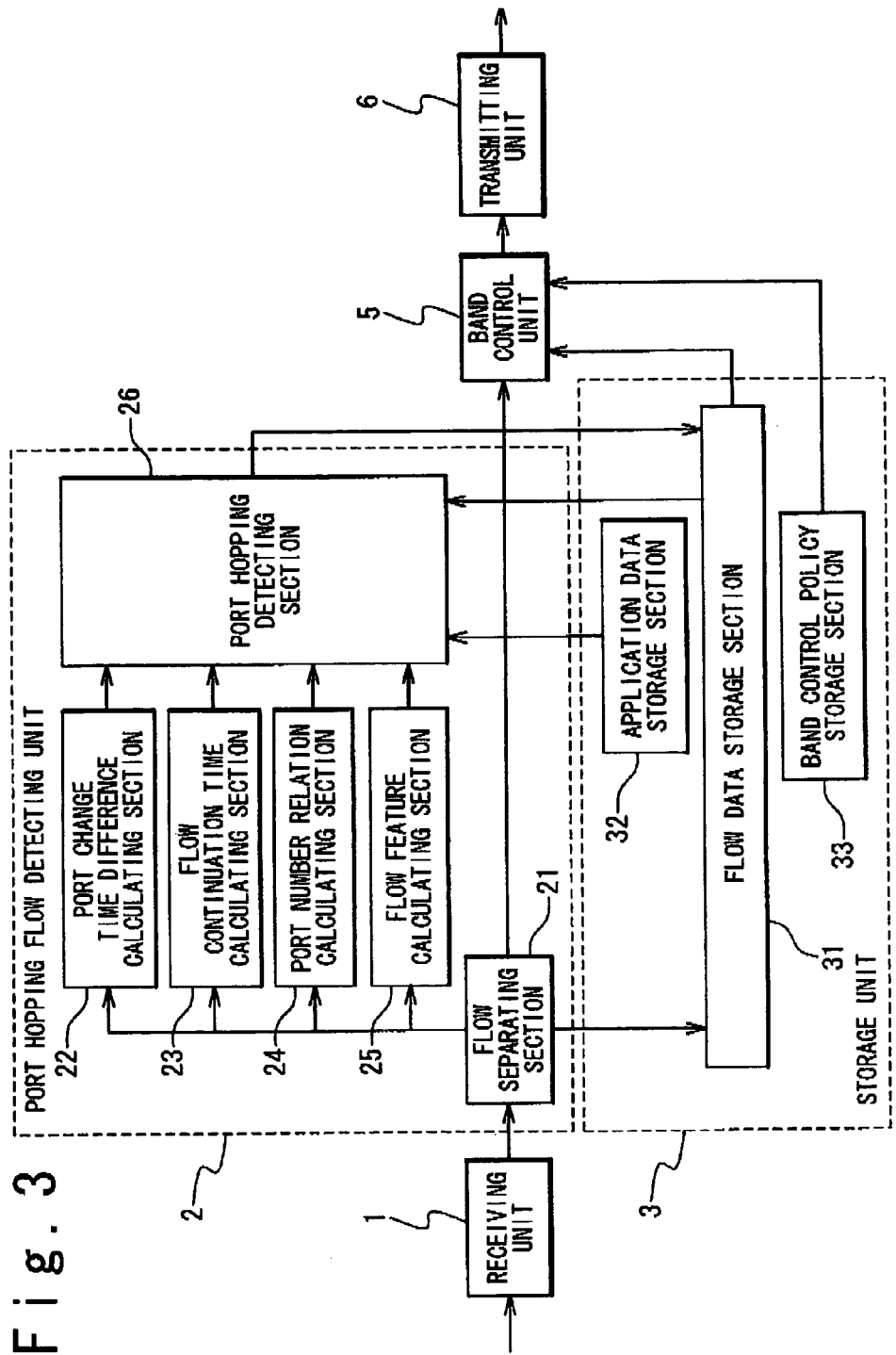
FIG. 3 is a block diagram showing configuration the port hopping flow detection system according to a second embodiment of the present invention.

Next, the port hopping flow detection system according to the second embodiment of the present invention will be described in detail. FIG. 3 is a block diagram showing the port hopping flow detection system according to the second embodiment. Referring to FIG. 3, the port hopping flow detection system in the second embodiment is provided with the receiving unit 1, the port hopping detecting unit 2, the storage section 3, a band control unit 5 and a transmitting unit 6. As could be understood, the second embodiment of the present invention is different from the first embodiment in that the band control unit 5 and the transmitting unit 6 are provided in place of the flow data display unit 4 in FIG. 1, and a band control policy storage section 33 is added in the storage section 3 and the flow separated by the flow separating section 21 is supplied to the band control unit 5.

The band control policy storage section 33 stores band control policies of a system manager. In addition to the conventional band control policy for each application, the band control policies stored in the storage section 33 are composed of a band control policy is "a used band width is restricted to a certain value for the flow carrying out the port hopping" or "use of band is prohibited". Alternatively, in another policy, the used band may be restricted for the flow having no identification result of the application type. However, it is desirable that the band restriction to the flow having no identification result of the application type is temporary so as not to influence the flow in real-time communication such as IP telephone. Moreover, it is desirable that the band control policy for each application is used as soon as the identification result of the application type is obtained.

The band control unit 5 restricts the band for the flow in accordance with the band control policies stored in the band control policy storage section 33 and the flow data for the flow. The transmitting unit 6 sends the flow subjected to the band restriction by the band control unit 5.

Figure 4:
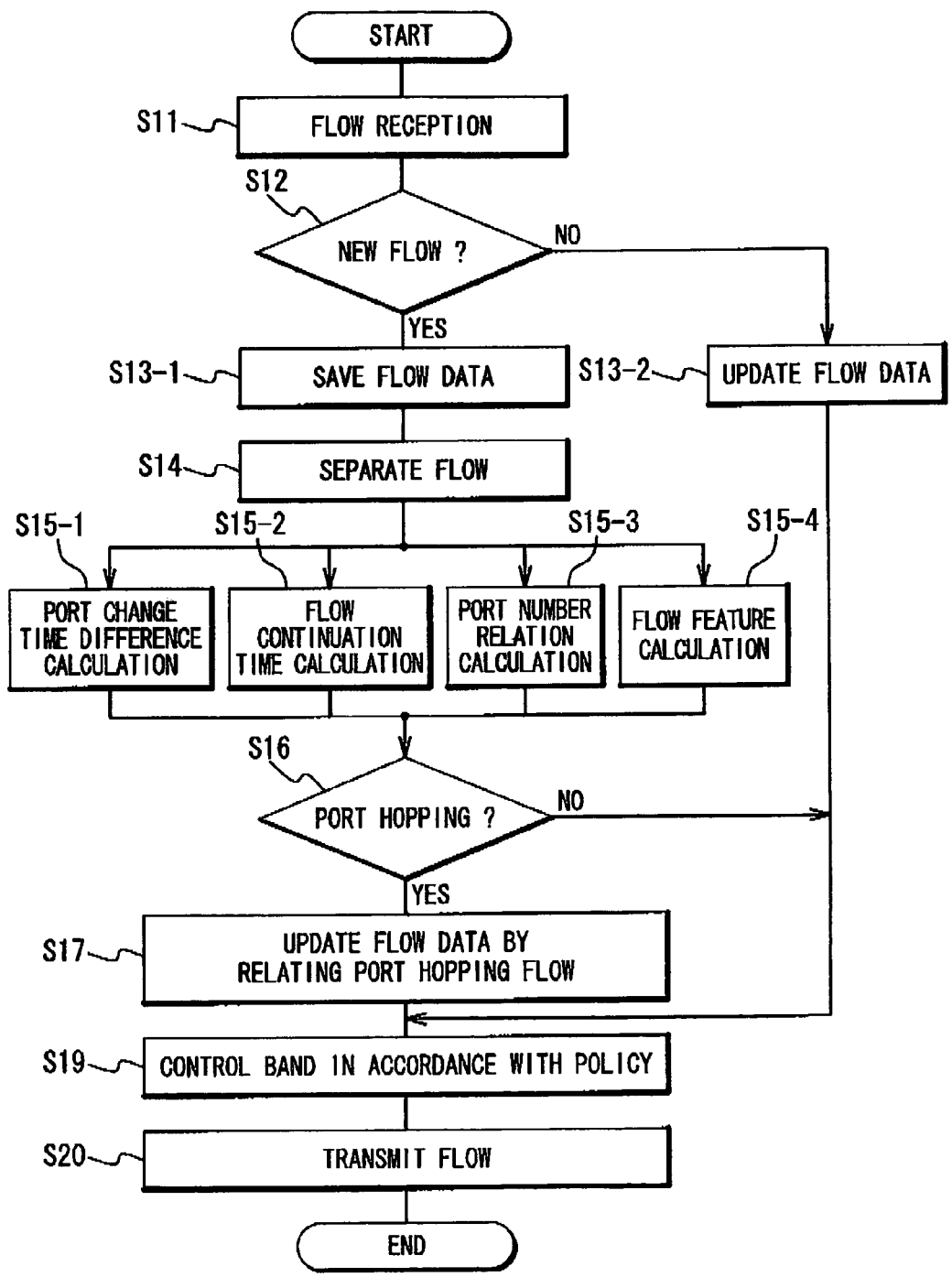
FIG. 4 is a flowchart showing an operation of the port hopping flow detection system according to the second embodiment of the present invention.

Next, referring to FIG. 4, an operation of the port hopping flow detection system according to the second embodiment of the present invention will be described in detail. The operation steps of the receiving unit 1, a port hopping detecting unit 2 and a storage section 3 in the present embodiment shown at steps S11 to S17 of FIG. 4 are the same as the operation steps of the unit 1, 2 and 3 in the first embodiment shown at the steps S1 to S7 of FIG. 2. Therefore, the description thereof will be omitted. In the present embodiment, steps S19 and S20 described later are performed in place of step S18.

(1) Step S9

In the first embodiment, the detection result of the port hopping is only displayed. In the present embodiment, band restriction is carried out in accordance with the band control policies stored in the band control policy storage section 33 and the flow data containing the port hopping flow detection result.

(2) Step S10

Next, the packets of the flow subjected to band restriction are transmitted. At this time, according to the band control policies, either step S8 in the first embodiment or steps S19 and S20 in the second embodiment may be selected. Alternatively, steps S19 and S20 may be carried out in addition to or continuously to step S8.

According to the second embodiment of the present invention, using the application identification result and the port hopping flow detection result, it is possible to continuously follow change of the flow between the ports and to carry out band restriction according to the band control policies. Furthermore, by temporarily restricting the used band with respect to the flow having no identification result of the application type, even when the port hopping is carried out prior to application identification, band restriction can be continuously performed with respect to the flow.

Figure 5:
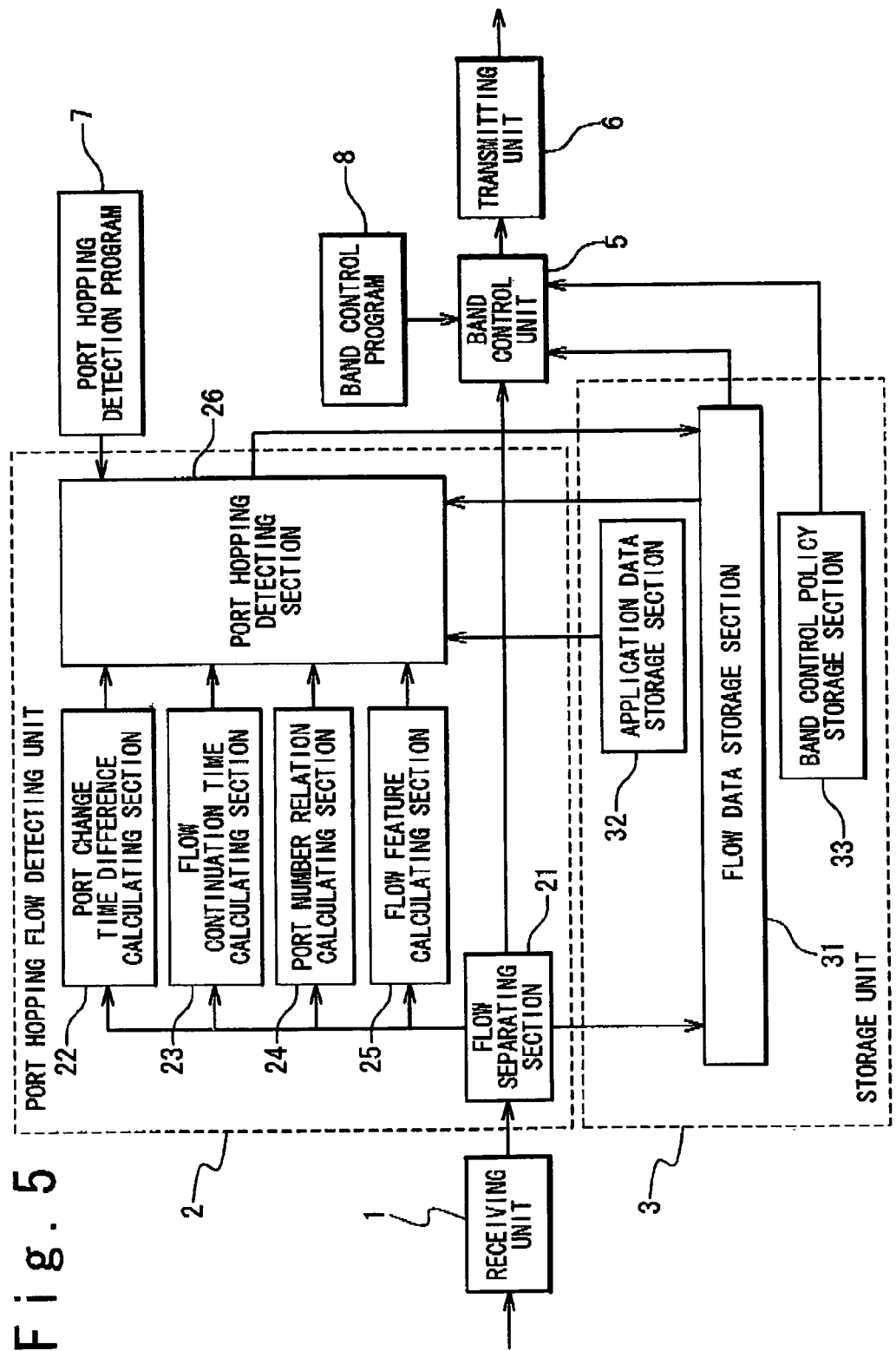
FIG. 5 is a block diagram showing configuration the port hopping flow detection system according to a third embodiment of the present invention.

Next, the port hopping flow detection system according to the third embodiment of the present invention will be described in detail. FIG. 5 is a block diagram showing the configuration of the port hopping flow detection system according to the third embodiment of the present invention. Referring to FIG. 5, like the second embodiment of the present invention, the port hopping flow detection system according to the third embodiment of the present invention is provided with the receiving unit 1, a port hopping detecting unit 2, a storage section 3, the band control unit 5 and the transmitting unit 6. The third embodiment of the present invention further includes a port hopping flow detection program 7 and a band control program 8.

The port hopping flow detection program 7 is read into the port hopping detecting unit 2 and used to control the operation of the port hopping detecting unit 2. According to control of the port hopping flow detection program 7, the port hopping detecting unit 2 performs the same processing as the processing by the port hopping detecting unit in the second embodiment. The band control program 8 is read into the band control unit 5 and used to control the operation of the band control unit 5. According to control of the band control program 8, the band control unit 5 performs the same processing as the processing by the band control unit in the second embodiment.

According to the third embodiment of the present invention, to obtain the same effects as in the first and second embodiments of the present invention, a computer can be used as the port hopping detecting unit and the band control unit by using the port hopping flow detection program and the band control program.

The application carrying out the port hopping has correlation with the port change time difference, the flow continuation time, the port number relation and the flow feature between flows before and after the port hopping. With such a configuration, by comparing the port change time difference, the flow continuation time, the port number relation and the flow feature of the flow with the flow data and the application data of the application carrying out the port hopping, the port hopping can be detected.

Also, according to the present invention, the application carrying out the port hopping has a relation in port change time difference, a flow continuation time, a port number relation and a flow feature between flows before and after the port hopping. Therefore, by comparing a port change time difference, a flow continuation time, a port number relation and a flow feature of the received flow with the flow data and the application data for the application, the features of the application can be grasped.

Also, change between ports of flow, which is generated by the application using the port hopping often, can be continuously followed. When the port hopping is detected according to the first effect, the flow data of the flows carrying out the port hopping are related to each other and stored.

Also, the identification accuracy of the application often using the port hopping can be improved. By referring to the flow data of the flows carrying out the port hopping according to the second effect, the flows before and after the port hopping can be treated as one flow. Therefore, the above-mentioned application can be observed for a long time.

What is claimed is:

1. A port hopping flow detection system comprising:
    a storage section configured to store flow data for each of past flows of packets which have been transmitted from application programs and an application data for each of the application programs;
    a receiving unit configured to receive a new flow of packets; and
    a detecting unit configured to extract a flow data for the new flow to store in said storage section, calculate an application data for the new flow from the extracted flow data for the new flow, to compare the calculated application data with the application data stored in the storage section, and determine from the comparison whether the new flow has been subjected to port hopping,
    wherein the application data includes a port change time difference which is calculated from the first packet reception time of the new flow and a last packet reception time of an existing flow,
    wherein said storage section further stores band control policies,
    said port hopping flow detection system further comprises:
    a band control unit configured to restrict a band for the packets of the new flow, which are sent from a flow separating section, based on said band control policies; and
    a transmitting unit configured to transmit the packets of the new flow whose band is restricted.

2. The port hopping flow detection system according to claim 1, wherein said flow data includes:
    a source IP (Internet Protocol) address, a destination IP address, a source port number, a destination port number and a protocol number which are contained in a header of the received packet.

3. The port hopping flow detection system according to claim 1, wherein the application data includes:
    a flow continuation time, a port number relation and a flow feature in addition to the port change time difference.

4. The port hopping flow detection system according to claim 3, wherein the detecting unit comprises:
    a port change time difference calculating section configured to calculate the port change time difference from a first packet reception time of the new flow and a last packet reception time of an existing flow;
    a flow continuation time calculating section configured to calculate the flow continuation time from the first packet reception times of the new flow and the existing flow;
    a port number relation calculating section configured to calculate the port number relation from a source port number and destination portion number for the new flow and those of the existing flow;
    a flow feature calculating section configured to calculate the flow feature of the received flow based on the listed flow data; and
    the flow separating section configured to extract the flow data for the new flow to store the extracted flow data in said storage section or update the flow data stored in said storage section, and list up the flow data which have same source IP address and destination IP address as those of the received packet of the new flow to supply the listed flow data to said port change time difference calculating section, said flow continuation time calculating section, said port number relation calculating section and said flow feature calculating section; and
    a port hopping detecting section configured to detect whether a port hopping is carried out in the new flow, based on the application data and the flow data for the new flow and the application data and flow data stored in said storage section.

5. The port hopping flow detection system according to claim 4, wherein said flow separating section deletes the flow data from said storage section when the flow data meets a predetermined condition.

6. The port hopping flow detection system according to claim 5, wherein when data held in said port change time difference calculating section, said flow continuation time calculating section, said port number relation calculating section and said flow feature calculating section meet a predetermined condition, said flow separating section deletes the data held in said port change time difference calculating section, said flow continuation time calculating section, said port number relation calculating section and said flow feature calculating section.

7. The port hopping flow detection system according to claim 4, further comprising:
    a display unit configured to display the flow data stored in said storage section.

8. The port hopping flow detection system according to claim 4, further comprising:
    a transmitting unit configured to transmit the packets of the new flow which are sent from said flow separating section.

9. The port hopping flow detection system of claim 1, wherein said receiving unit is comprised by a device disposed between a source device and a destination device of the new flow in a path of the new flow.

10. An operation method of a port hopping flow detection system, comprising:
    receiving a new flow of packets;
    extracting a flow data for the new flow to store in a storage section, which store flow data for each of past flows of packets which have been transmitted from application programs and an application data for each of the application programs;
    calculating an application data for the new flow from the extracted flow data for the new flow;
    comparing the calculated application data and the flow data for the new flow with the application data and the flow data for the past flows stored in the storage section to determine whether the new flow has been subjected to port hopping;
    restricting a band for the packets of the new flow, based on band control policies which are stored in said storage section; and
    transmitting the packets of the new flow whose band is restricted,
    wherein the application data includes a port change time difference which is calculated from the first packet reception time of the new flow and a last packet reception time of an existing flow.

11. The operation method according to claim 10, wherein said flow data includes:
    a source IP (Internet Protocol) address, a destination IP address, a source port number, a destination port number and a protocol number which are contained in a header of the received packet.

12. The operation method according to claim 10, wherein the application data includes:
   a flow continuation time, a port number relation and a flow feature in addition to the port change time difference.

13. The operation method according to claim 12, wherein said calculating comprises:
   calculating the port change time difference from a first packet reception time of the new flow and a last packet reception time of an existing flow;
   calculating the flow continuation time from the first packet reception times of the new flow and the existing flow;
   calculating the port number relation from a source port number and destination portion number for the new flow and those of the existing flow; and
   calculating the flow feature of the received flow based on the listed flow data.

14. The operation method according to claim 13, further comprising:
   deleting the flow data from said storage section when the flow data meets a predetermined condition.

15. The operation method according to claim 13, further comprising: displaying the flow data stored in said storage section.

16. The operation method according to claim 13, further comprising: transmitting the packets of the new flow which are sent from said flow separating section.

17. The operation method of claim 10, wherein said receiving comprises the receiving of the new flow by a device disposed between a source device and a destination device of the new flow in a path of the new flow.

18. A non-transitory computer-readable storage medium storing computer instructions for causing a computer executing the instructions to perform an operation method of a port hopping flow detection system, wherein the operation method comprises:
   receiving a new flow of packets;
   extracting a flow data for the new flow to store in a storage section, which store flow data for each of past flows of packets which have been transmitted from application programs and an application data for each of the application programs;
   calculating an application data for the new flow from the extracted flow data for the new flow;
   comparing the calculated application data and the flow data for the new flow with the application data and the flow data for the past flows stored in the storage section to determine whether the new flow has been subjected to port hopping;
   restricting a band for the packets of the new flow, based on band control policies which are stored in said storage section; and
   transmitting the packets of the new flow whose band is restricted,
   wherein the application data includes a port change time difference which is calculated from the first packet reception time of the new flow and a last packet reception time of an existing flow.

19. A non-transitory computer-readable storage medium according to claim 18, wherein said calculating comprises:
   calculating the port change time difference from a first packet reception time of the new flow and a last packet reception time of an existing flow;
   calculating the flow continuation time from the first packet reception times of the new flow and the existing flow;
   calculating the port number relation from a source port number and destination portion number for the new flow and those of the existing flow; and
   calculating the flow feature of the received flow based on the listed flow data.

20. A non-transitory computer readable storage medium of claim 18, wherein said receiving comprises the receiving of the new flow by a device disposed between a source device and a destination device of the new flow in a path of the new flow.

* * * * *